US008169423B2

(12) United States Patent
Takeuchi et al.

(10) Patent No.: US 8,169,423 B2
(45) Date of Patent: May 1, 2012

(54) ELECTRONIC WRITING INSTRUMENT, COMPUTER SYSTEM, ELECTRONIC WRITING METHOD AND COMPUTER READABLE MEDIUM

(75) Inventors: Shin Takeuchi, Ashigarakami-gun (JP); Eisuke Osakabe, Ashigarakami-gun (JP); Eigo Nakagawa, Ashigarakami-gun (JP); Hiroyuki Funo, Ashigarakami-gun (JP); Tomohito Takagi, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1061 days.

(21) Appl. No.: 12/058,272

(22) Filed: Mar. 28, 2008

(65) Prior Publication Data
US 2008/0285070 A1 Nov. 20, 2008

(30) Foreign Application Priority Data

May 15, 2007 (JP) .................................. 2007-129668

(51) Int. Cl.
*G06F 3/033* (2006.01)
(52) U.S. Cl. ...... 345/179; 345/180; 382/188; 178/19.05
(58) Field of Classification Search .......... 345/179–183; 382/188; 178/19.05; 250/227.13
See application file for complete search history.

(56) References Cited

U.S. PATENT DOCUMENTS

| 5,453,762 | A | * | 9/1995 | Ito et al. ........................ 345/179 |
| 2001/0024193 | A1 | * | 9/2001 | Fahraeus ........................ 345/173 |
| 2002/0126105 | A1 | * | 9/2002 | O'Donnell, Jr. .............. 345/179 |

FOREIGN PATENT DOCUMENTS

| JP | 2002062984 A | 2/2002 |
| JP | 2002182838 A | 6/2002 |
| JP | 2003-523572 A | 8/2003 |
| JP | 2004-094907 A | 3/2004 |
| JP | 2005309633 A | 11/2005 |
| WO | WO 01/61455 A1 | 8/2001 |

OTHER PUBLICATIONS

English-language translation of Japanese Patent Office Action dated Sep. 6, 2011.

* cited by examiner

*Primary Examiner* — Amare Mengistu
*Assistant Examiner* — Koosha Sharifi-Tafreshi
(74) *Attorney, Agent, or Firm* — Sughrue Mion, PLLC (57) ABSTRACT

The electronic writing instrument is provided with: a writing unit that writes down on a medium where a code indicating identity information and location information of the medium is formed; an emitting unit that emits light to the medium; a photoelectric conversion unit that includes photoelectric conversion element receiving a reflected light from the medium by the light emitted by the emitting unit and outputting an electronic signal after converting the reflected light by photoelectric conversion; a receiving unit that receives a user operation; and a condition changing unit that changes at least any one of an emitting condition of the emitting unit to the medium and an output condition of the photoelectric conversion unit when the receiving unit receives an operation.

13 Claims, 9 Drawing Sheets

| INFRARED LED UNIT | THE NUMBER OF EMITTING LEDS | EMISSION RANGE | DRIVE FREQUENCY | DRIVE PULSE WIDTH | DRIVING CURRENT |
|---|---|---|---|---|---|
| FIRST LIGHT EMITTING CONDITION (WRITING MODE) | 1 | 5MM X 5MM | 60 Hz | 1ms OR LESS | 50 TO 100 mA |
| SECOND LIGHT EMITTING CONDITION (REFERENCE INFORMATION ACQUIRING MODE) | 3 | 10MM X 10MM | 10Hz | 50ms OR MORE | MORE THAN 100 mA |

FIG.9B

| INFRARED CMOS | READ RANGE | AQUIRED LINE | DRIVE FREQUENCY |
|---|---|---|---|
| FIRST LIGHT RECEIVING CONDITION (WRITING MODE) | 5MM X 5MM | EVERY OTHER LINE | 60 Hz |
| SECOND LIGHT RECEIVING CONDITION (REFERENCE INFORMATION ACQUIRING MODE) | 10MM X 10MM | ALL LINES | 10Hz |

FIG.9C

| IMAGE PROCESSING UNIT | BINARY PROCESSING | DOT DETECTION | CODE ANALYSIS |
|---|---|---|---|
| FIRST IMAGE PROCESSING CONDITION (WRITING MODE) | ONE-DIMENSIONAL FILTER IS USED | PROCESSING FOR EACH LINE | ONCE |
| SECOND IMAGE PROCESSING CONDITION (REFERENCE INFORMATION ACQUIRING MODE) | TWO-DIMENSIONAL FILTER IS USED | PROCESSING FOR EACH AREA | PLURAL TIMES |

ELECTRONIC WRITING INSTRUMENT, COMPUTER SYSTEM, ELECTRONIC WRITING METHOD AND COMPUTER READABLE MEDIUM

CROSS REFERENCE TO RELATED APPLICATIONS

This application is based on and claims priority under 35 USC §119 from Japanese Patent Application No. 2007-129668 filed May 15, 2007.

BACKGROUND

1. Technical Field

The present invention relates to an electronic writing instrument, a computer system, an electronic writing method and a computer readable medium storing a program used for computerizing a writing operation to a medium such as a sheet of paper.

2. Related Art

Using a sheet whose surface includes a printed code image formed from various different patterns and a pen device in which an image pickup device is embedded, the pen device is used for writing on the sheet and the code images corresponding to a written character, a figure and the like are read into the image pickup device.

SUMMARY

According to an aspect of the invention, there is provided an electronic writing instrument including: a writing unit that writes down on a medium where a code indicating identity information and location information of the medium is formed; an emitting unit that emits light to the medium; a photoelectric conversion unit that includes photoelectric conversion element receiving a reflected light from the medium by the light emitted by the emitting unit and outputting an electronic signal after converting the reflected light by photoelectric conversion; a receiving unit that receives a user operation; and a condition changing unit that changes at least any one of an emitting condition of the emitting unit to the medium and an output condition of the photoelectric conversion unit when the receiving unit receives an operation.

BRIEF DESCRIPTION OF THE DRAWINGS

Exemplary embodiment (s) of the present invention will be described in detail based on the following figures, wherein.

DETAILED DESCRIPTION

Hereinafter, exemplary embodiments of the present invention will be described in detail with reference to the attached drawings.

Figure 1:
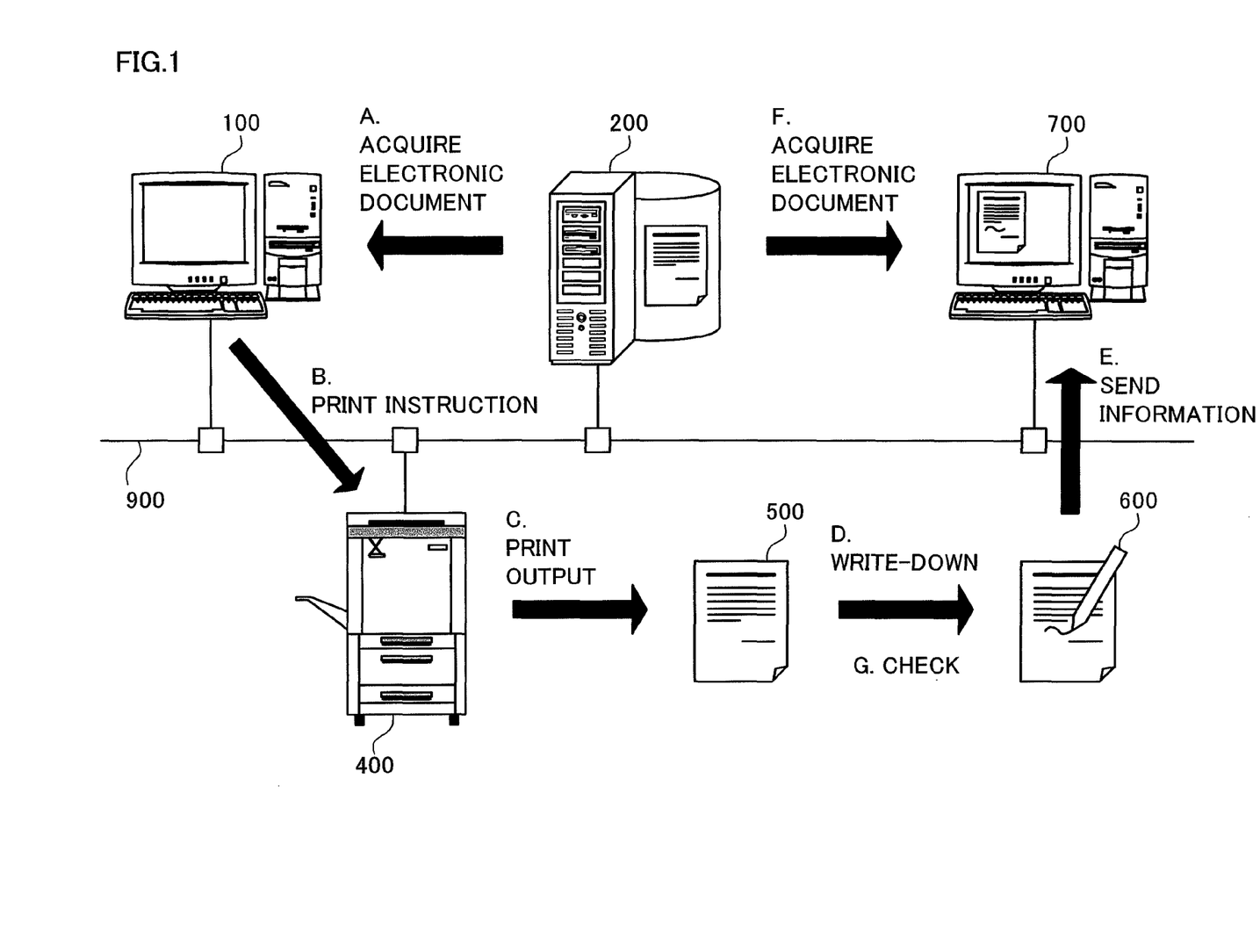
FIG. 1 shows an example of a configuration of a writing information processing system to which the exemplary embodiment is applied.

FIG. 1 shows an example of a configuration of a writing information processing system to which the exemplary embodiment is applied. The writing information processing system according to the present exemplary embodiment is configured to include a terminal apparatus 100 that instructs an image forming apparatus 400 to print an electronic document, a document server 200 that stores the electronic document, and the image forming apparatus 400 that prints an image in which a code pattern image is superimposed on an electronic document image.

The writing information processing system according to the present exemplary embodiment further includes a printed material 500 as an example of a medium that is outputted by the image forming apparatus 400, a digital pen 600 as an example of a pen device that records a character or a figure onto the printed material 500 and also reads a trace of the recorded character or the figure, and a terminal apparatus 700 as an example of an information processing apparatus that displays the trace received from the digital pen 600 superimposed on an electronic document received from the document server 200.

In addition, in the writing information processing system according to the present exemplary embodiment, the terminal apparatus 100, the document server 200, the image forming apparatus 400 and the terminal apparatus 700 are interconnected via a network 900 with each other. The digital pen 600 is connected with the terminal apparatus 700 via a wireless network (not shown in the figure).

An operation of the writing information processing system according to the present exemplary embodiment is outlined below.

First, the terminal apparatus 100 acquires an electronic document that is to be printed, from the document server 200(A). Then, the terminal apparatus 100 instructs the image forming apparatus 400 to print the electronic document (B). At this time, the terminal apparatus 100 specifies a print attribute which is a parameter concerning the printing. This print attribute includes a sheet size, a direction, both-side printing and the like, similarly to the case in the normal printing. With respect to the code image, that is, a code pattern image, specification of an area on which the code pattern image is printed or the like may be included.

When receiving an instruction to print the electronic document, the image forming apparatus 400 outputs the printed material 500 as a paper or the like on which the code pattern image superimposed on an electronic document image is printed (C). In this case, the code pattern image is an image generated from both an identity code corresponding to the identity information and a location code corresponding to the location information. Alternatively, the code pattern image may be an image generated from them and additional information as other information. The processing of superimposing the code pattern image on the electronic document image may be carried out in the terminal apparatus 100 or in the image forming apparatus 400.

Here, as the identity information, information that uniquely identifies each medium is adopted. For example, it may be information acquired by combining an identity number of the image forming apparatus 400 with a serial number for printing the medium in the image forming apparatus 400 or printing date and time, or information centrally managed so that no duplication occurs on a predetermined server. Alternatively, as the identity information, information that does not uniquely identifies each medium but that uniquely identifies an electronic document printed on the medium may be adopted.

The location information indicates information for specifying a coordinate location (X-coordinate, Y-coordinate) on each medium. For example, the coordinates may be represented with a coordinate system in which the origin is set as the left top point of the medium, X-axis is set as the right direction of the medium and Y-axis is set as the downward direction.

Further, additional information may include identity information of a user who instructs to print and information of copy prohibition.

The image forming apparatus 400 forms a code pattern image as an invisible image using invisible toner having an infrared light absorption rate of a certain level or higher. On the other hand, a document image of the electronic document is preferably formed as a visible image using visible toner with an infrared light absorption rate of a certain level or lower. The difference in infrared light absorption rate is set between toner used to form the code pattern image and toner used to form a document image so that the reading precision at the reading of the code pattern image by infrared light emitting by the digital pen 600 or the like is secured. In the present exemplary embodiment, description will be given with the reading of a code pattern image by infrared light emitting as a premise. However, the reading of the code pattern image by ultraviolet light emitting may be also allowed.

Assume a case where a user thereafter uses the digital pen 600 to write characters or figures onto the printed material 500(D). When the user uses the digital pen 600 to write a character and a figure on the printed material 500, the digital pen 600 is set to a writing mode which is an example of a first acquiring mode in the present exemplary embodiment as later mentioned. At this time, the digital pen 600 performs a writing operation on the printed material 500 and emits an infrared light on the printed material 500 at the same time, and an infrared image is inputted to the digital pen 600 by detecting reflected light thereof. Then, the digital pen 600 acquires information from the infrared image and, via wireless communication, sends the information to the terminal apparatus 700(E). The information sent here includes, for example, the identity information for the printed material 500, and the location information of the written character or figure on the printed material 500.

Then, the terminal apparatus 700, based on the identity information received from the digital pen 600, acquires an electronic document which is a source of the document image printed on the printed material 500 from the document server 200(F). Then, the terminal apparatus 700 displays the information acquired from the digital pen 600 superimposed on the electronic document acquired from the document server 200.

Assume a case where a user checks a specific area of the printed material 500 using the digital pen 600(G). When a digital pen 600 is used to check the specific area of the printed material 500, it is set to the reference information acquiring mode which is an example of a second acquiring mode in the present exemplary embodiment later mentioned. At this time, the digital pen 600, similarly to the case of the writing mode, emits an infrared light on the printed material 500, and an infrared light image is inputted to the digital pen 600 by detecting the reflected light thereof. The digital pen 600 acquires information from the infrared image, and, via the wireless communication, sends the information to the terminal apparatus 700(E). The information sent here includes, for example, the identity information for the printed material 500 and the location information at a specific area checked out of the printed material 500. In the reference information acquiring mode, a writing operation on the printed material 500 may be performed, or may not be performed.

Then, the terminal apparatus 700, based on the identity information and the location information received from the digital pen 600, acquires an electronic document corresponding to the identity information and the location information, from the document server 200(F). Then, the terminal apparatus 700 displays the electronic document acquired from the document server 200.

Here, when the identity information received from the digital pen 600 is the information that uniquely identifies each medium, in order to acquire an electronic document based on the identity information, it is necessary to manage correspondence relationship between the identity information and the electronic document. In the writing information processing system shown in FIG. 1, a portion that manages such the correspondence relationship is not clarified, but any portion may manage it as far as it is accessible from the terminal apparatus 700. For example, it may be the document server 200 or the image forming apparatus 400. If the identity information received from the digital pen 600 uniquely identifies an electronic document printed on the medium, the electronic document is acquired without referencing such the correspondence relationship.

In the writing mode, if the terminal apparatus 700 receives trace information from the digital pen 600, the trace information is displayed so that the trace information is superimposed on the location of the electronic document corresponding to the writing location on the printed material 500. Since the location information is included in the code pattern image read by the digital pen 600, the location information specifies the corresponding location on the display image of the electronic document.

On the other hand, in the reference information acquiring mode, in order for the terminal apparatus 700 to acquire an electronic document based on the identity information and the location information received from the digital pen 600, the correspondence relationship of the identity information and the location information with electronic document must be managed. In the writing information processing system shown in FIG. 1, a portion that is to manage such the correspondence relationship is not clarified, but any portion may manage it as far as it is accessible from the terminal apparatus 700. For example, it may be the document server 200 or the image forming apparatus 400.

The above mentioned configuration of the writing information processing system to which the present exemplary embodiment is applied is only an example. For example, processing for superimposing the code pattern image on the electronic document image is configured so as to be performed by a device such as a server computer that relays the print instruction from the terminal apparatus 100 to the image forming apparatus 400. The document server 200 may be installed in the terminal apparatus 100. Further, the terminal apparatus 100 and the terminal apparatus 700 may be configured in the same terminal apparatus.

In the present exemplary embodiment, the term "electronic document" is used. However, it does not only indicate electronic data of a document including a text. For example, the "electronic document" includes image data (not depending on raster data or vector data) such as pictures, photographs, figures and the like, and other electronic data (electronic document) used for printing.

Next, code pattern images printed by the image forming apparatus 400 are described below.

Figure 2A:
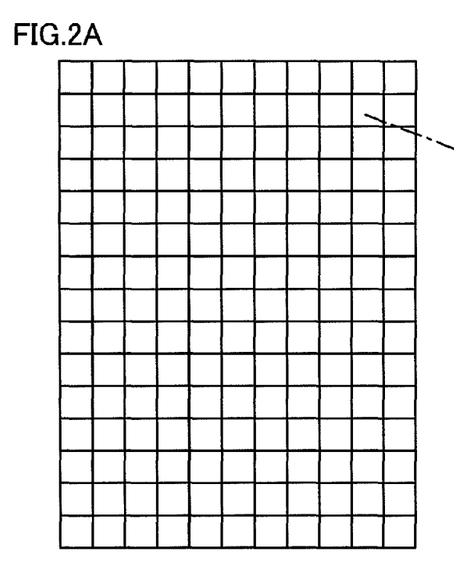
FIGS. 2A to 2C are diagrams for explaining the code pattern images.
Figure 2B:
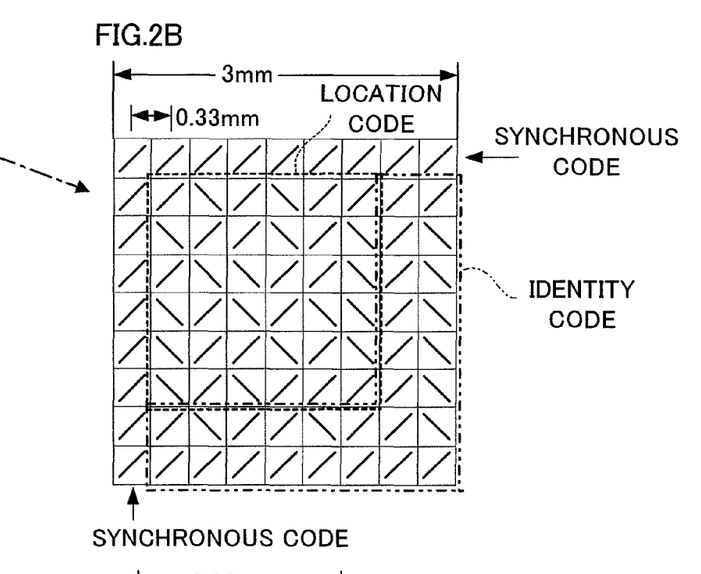
Figure 2C:
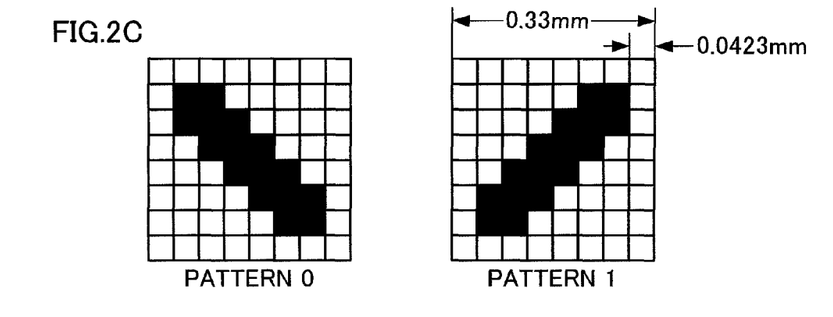

FIGS. 2A to 2C are diagrams for explaining the above mentioned code pattern images. FIG. 2A schematically shows a two-dimensional code arrangement formed as an invisible image. FIG. 2B shows an expanded diagram of the two-dimensional code, which is a unit of the two-dimensional code arrangement shown in FIG. 2A. Further, FIG. 2C is a diagram for explaining pattern images of a backslash "\" and a slash "/."

In the present exemplary embodiment, the code pattern images shown in FIGS. 2A to 2C are formed by using an invisible image forming material having an absorption wavelength in an infrared region. The code pattern images shown in FIGS. 2A to 2C are formed by transparent toner having, for example, the maximum absorption rate of not more than seven (7) percents in the visible light region (400 nm to 700 nm) and an absorption rate of not less than 30 percents in the near infrared region (800 nm to 1000 nm) as an example of the invisible toner. In addition, in order to increase an ability of the absorption in the near infrared region that is necessary for mechanically reading of an image, the invisible toner, as an example of the image forming material, having 100 nm to 600 nm as a range of an average dispersion diameter is adopted. Here, with regard to "visible" and "invisible," they are independent of recognition with eyes. "Visible" and "invisible" are differentiated based on whether an image formed on the printed medium has a chromogenic property due to absorption of a specific wavelength in the visible light region. Additionally, "invisible" includes the region that is difficult to be recognized with human eyes and that has a little chromogenic property due to absorption of the specific wavelength in the visible light region.

As described above, in the present exemplary embodiment, a code pattern image is formed by transparent toner that is an example of the invisible toner so that tone of the image printed on a medium is not affected and the identity information and the location information are embedded.

The code pattern image provides a stable operation of mechanical reading and the decoding processing with an infrared light emission for the long term, and is formed with an invisible image that records information with high density. It is also preferable that the invisible image gives less noise to the visible image on the surface of the medium on which the image is outputted. Moreover, for example, it is preferable that the invisible image is discriminated in terms of brightness difference from an area in which no images are formed. For example, an invisible image is formed on the entire surface of the medium (paper surface) while being adjusted with the size of the printed medium. However, "the entire surface" does not indicate that four corners of the sheet are all included. In an image forming apparatus using an electrophotographic method or the like, since the peripheral area of a paper sheet is usually unprintable, even if there is no printed invisible image on the peripheral area, an image is regarded as an image formed on "the entire surface."

The two-dimensional code shown in FIG. 2B includes an area that stores location codes indicating the coordinate location on the medium and an area that stores identity codes that uniquely specify a medium and the like. It also includes an area that stores synchronous codes. As shown in FIG. 2A, plural two-dimensional codes are arranged on a surface of the medium in a grid pattern. That is, on the surface of the medium, the plural two-dimensional codes as shown in FIG. 2B are arranged, each of which has the location codes, the identity codes and the synchronous codes. The area for the plural location codes stores the location information that is different by the arranged location. On the other hand, the area for the plural identity codes stores the same identity information independent of the arranged location.

In FIG. 2B, the location codes are arranged within a rectangle area of 6 bits by 6 bits. Each bit value is formed by a bitmap of plural minute lines with different rotation angles so as to represent bit values zero (0) and one (1) in the pattern image (a pattern 0 and a pattern 1) as shown in FIG. 2C. More specifically, using the backslash "\" and the slash "/" which have different inclination angles with each other, bit values 0 and 1 are represented. The pattern image has a size of 8 pixels by 8 pixels with 600 dpi, and a pattern image having a rising diagonal stroke from bottom right to top left (the pattern 0) represents the bit value 0, whereas a pattern image having a rising diagonal stroke from bottom left to top right (the pattern 1) represents the bit value 1. Thus, the different inclination angles of the pattern images represent one bit information (0 or 1).

In other words, the location code area shown in FIG. 2B stores the location information of 36 bits in total. According to the present exemplary embodiment, 18 bits out of 36 bits are used for encoding X-coordinate and the other 18 bits are used for encoding Y-coordinate. If 18 bits each is fully used for encoding the locations, $2^{18}$ (approximately 260 thousand) locations are encoded. In the present exemplary embodiment, each pattern image is composed of 8 pixels by 8 pixels (with 600 dpi), as shown in FIG. 2C. One dot size for 600 dpi is approximately 0.0423 mm, thus the size of the two-dimensional code (including the synchronous codes) in FIG. 2B is approximately 3 mm (8 pixels×9 bits×0.0423 mm) in length and width. If 260 thousand locations are encoded with 3-mm interval, the length of about 786 m is encoded. In this way, 18 bits all may be used for encoding locations, or if detection of the pattern image causes an error, redundant bits for error detection and error correction may be included.

The identity codes are arranged within rectangle areas of 2 bits by 8 bits and 6 bits by 2 bits, and stores the identity information of 28 bits in total. If 28 bits are used for the identity information, $2^{28}$ types (about 270 million types) of the identity information are represented. The identity code may include redundant bits within 28 bits for error detection and error correction, similarly to the location code.

In an example as shown in FIG. 2C, two pattern images have angular difference of 90 degrees each other. If the angular difference is set to 45 degrees, four pattern images are formed. If such pattern images are formed, the pattern images represent information of two bits (0 to 3). In other words, by increasing variation of angles for pattern images, bit number to be represented may be increased.

In another example shown in FIG. 2C, encoding a bit value is explained using pattern images. However, other way than pattern images may be adopted. For example, a bit value may be encoded by using ON or OFF of dots or a direction of a dot deviated from a reference position.

Next, the digital pen 600 according to the present exemplary embodiment is described.

Figure 3:
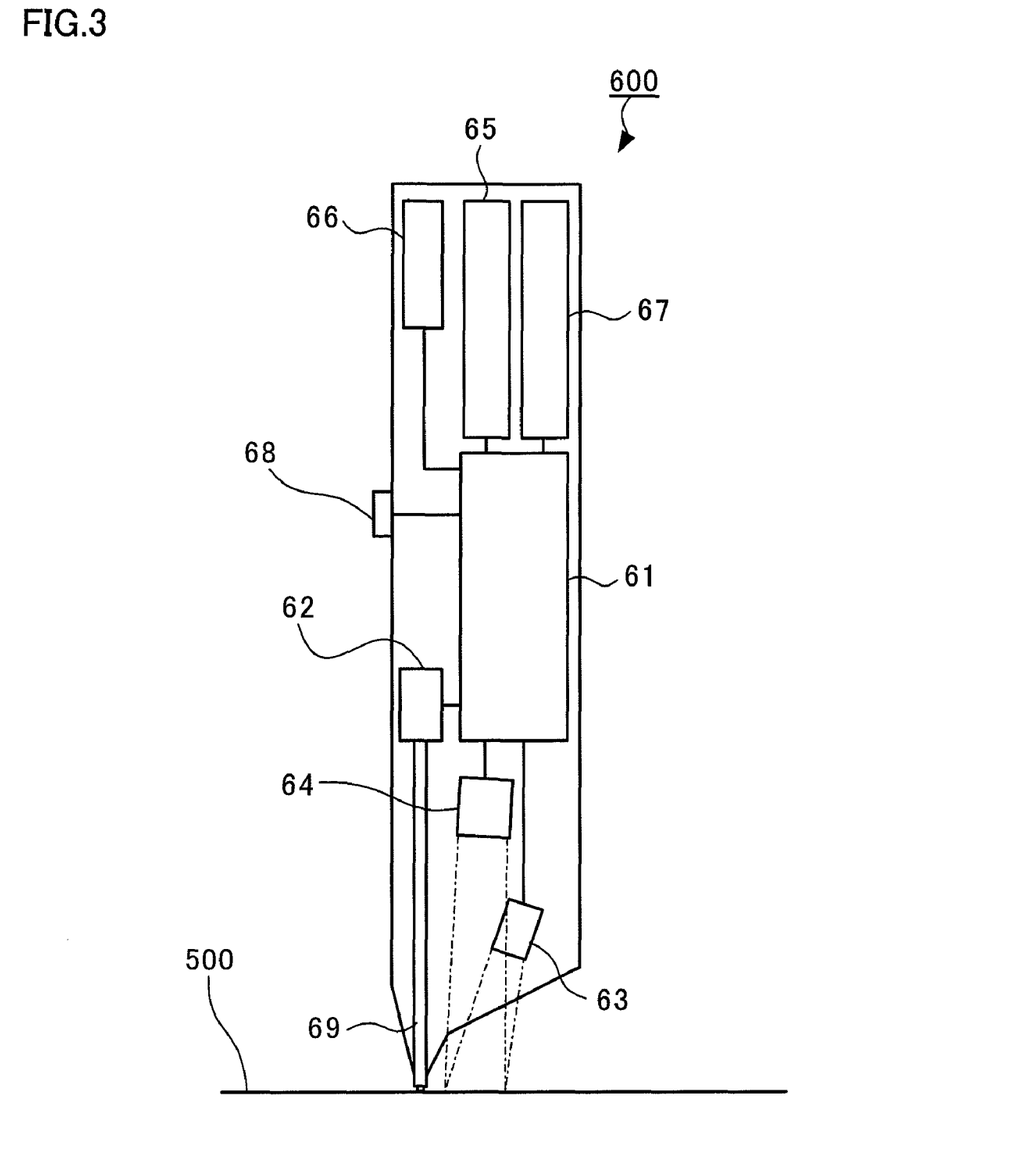
FIG. 3 shows a configuration of the digital pen.

FIG. 3 shows a configuration of the digital pen 600. As shown in the figure, the digital pen 600 has a controller 61 that works as a changing unit and a condition changing unit to control all the pen operations. To the controller 61, a pressure sensor 62 that detects a writing operation of the digital pen 600 by detecting a pressure applied to a pen tip 69 which functions as an example of a writing unit according to the present exemplary embodiment is connected. Further, to the controller 61, an infrared LED (Light Emitting Diode) unit 63 that emits an infrared light on a medium and an infrared CMOS (Complementary Metal Oxide Semiconductor) 64 that reads a code pattern image by detecting an infrared reflected light from the printed material 500 are connected. Furthermore, to the controller 61, an information memory 65 for storing the identity information, the location information and the additional information, a communication unit 66 for communicating with external apparatuses such as the terminal apparatus 700, a battery 67 for driving the pen, and a switch 68 that receive switching of an operation mode for the digital pen 600 are also connected. In the present exemplary embodiment, an acquiring unit is configured by the controller 61, the infrared LED unit 63 and the infrared CMOS 64 and so on.

Here, in the present exemplary embodiment, the switch 68 that functions as a receiving unit is the one that receives a switching operation between the writing mode and the reference information acquiring mode by a user. For example, a condition in which the switch 68 is not pressed may be set to "the writing mode," whereas another condition in which the switch 68 is once pressed may be set to "the reference information acquiring mode." If the switch 68 is further pressed one more time, the condition returns to "the writing mode."

Figure 4:
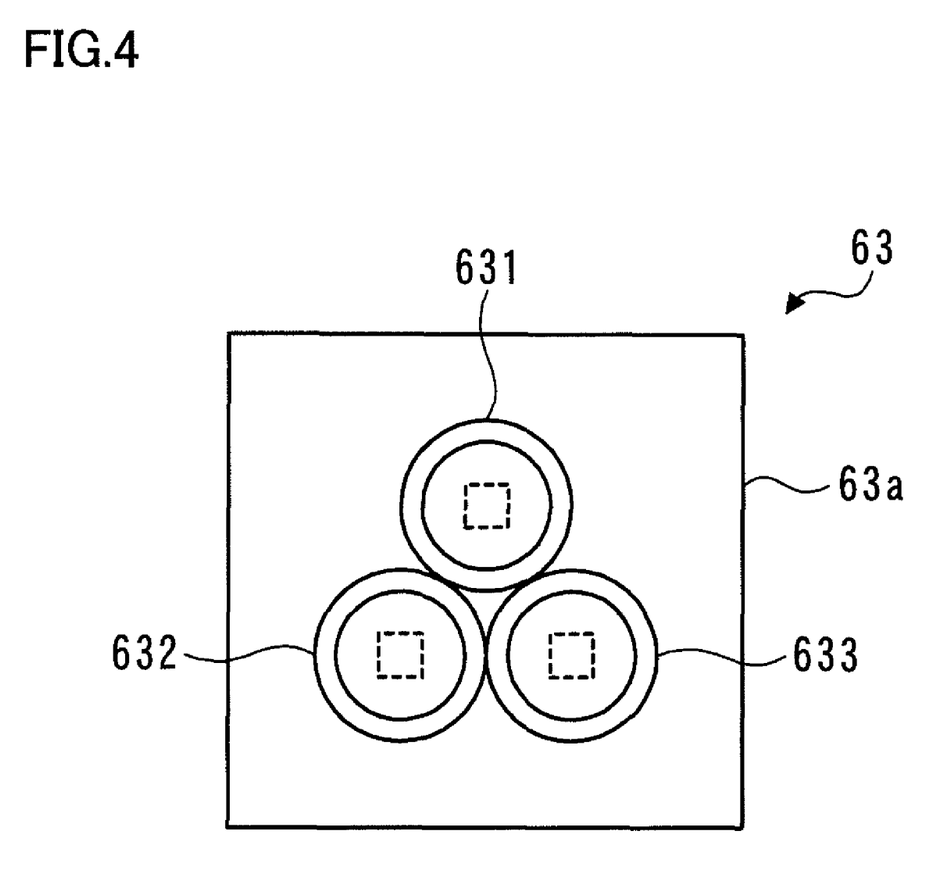
FIG. 4 shows a configuration of the infrared LED unit shown in FIG. 3.

FIG. 4 shows a configuration of the infrared LED unit 63 shown in FIG. 3.

The infrared LED unit 63 that functions as an example of an emitting unit according to the present exemplary embodiment includes a substrate 63a and three infrared LEDs (light-emitting diodes) that are mounted on the substrate 63a, that is, a first infrared LED 631, a second infrared LED 632 and a third infrared LED 633. The first infrared LED 631, the second infrared LED 632 and the third infrared LED 633 are arranged in a triangular shape. Each of the first infrared LED 631, the second infrared LED 632 and the third infrared LED 633 emits a light with a wavelength (850 nm in the present exemplary embodiment) corresponding to the absorption wavelength in the infrared region of the code pattern images formed on the printed material 500.

Figure 5:
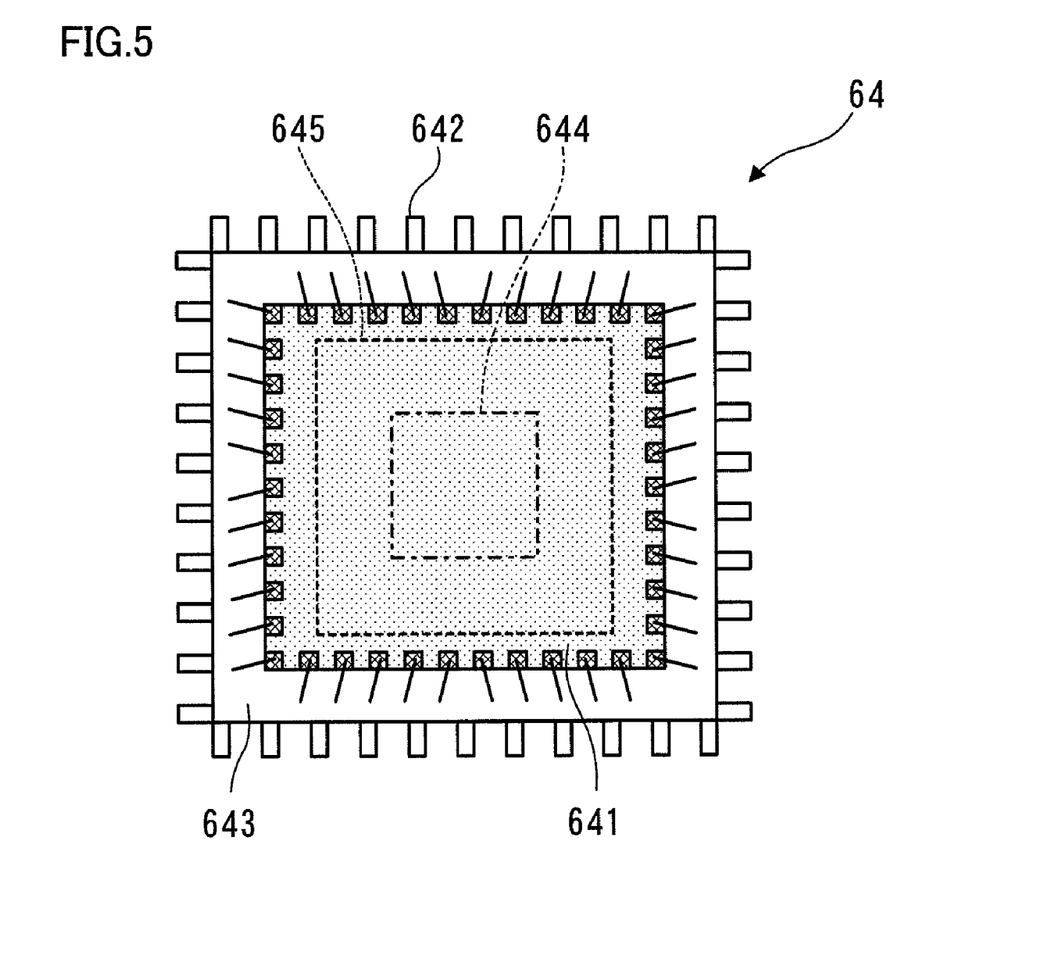
FIG. 5 shows a configuration of the infrared CMOS shown in FIG. 3.

FIG. 5 shows a configuration of the infrared CMOS 64 shown in FIG. 3.

The infrared CMOS 64 that functions as an example of a photoelectric conversion unit according to the present exemplary embodiment includes an infrared CMOS chip 641, a lead frame 642 that is electrically connected with the infrared CMOS chip 641, and a package unit 643 that integrates the infrared CMOS chip 641 and the lead frame 642 in a resin mold.

The infrared CMOS chip 641 has plural photo transistors arranged in vertical and horizontal directions in a matrix pattern. The infrared CMOS chip 641 outputs a received-light data with a so-called XY addressing method in which the output of the received-light data is selected per cell. As a result, the infrared CMOS chip 641 arbitrarily selects and outputs, among all received-light data of each cell, for example, received-light data of cells installed in a first light receiving area 644 and, for example, received-light data of cells installed in a second light receiving area 645 that is larger than the first light receiving area 644. Since the infrared CMOS chip 641 adopts the XY addressing method, the received-light data from all lines configured by cells and, for example, the received-light data from a half number of lines that is every other lines in all lines are arbitrarily selected and outputted. In this case, if the former output resolution is, for example, 600 dpi, the latter output resolution of the received-light data decreases to a half of the former output resolution, that is, 300 dpi.

As shown in FIG. 3, the infrared CMOS 64 receives an infrared reflected light that is emitted from the infrared LED unit 63 and then that is reflected by the printed material 500. In the present exemplary embodiment, the infrared CMOS 64 is configured so as to receive a diffusely reflected light among an infrared reflected light from the printed material 500.

Figure 6A:
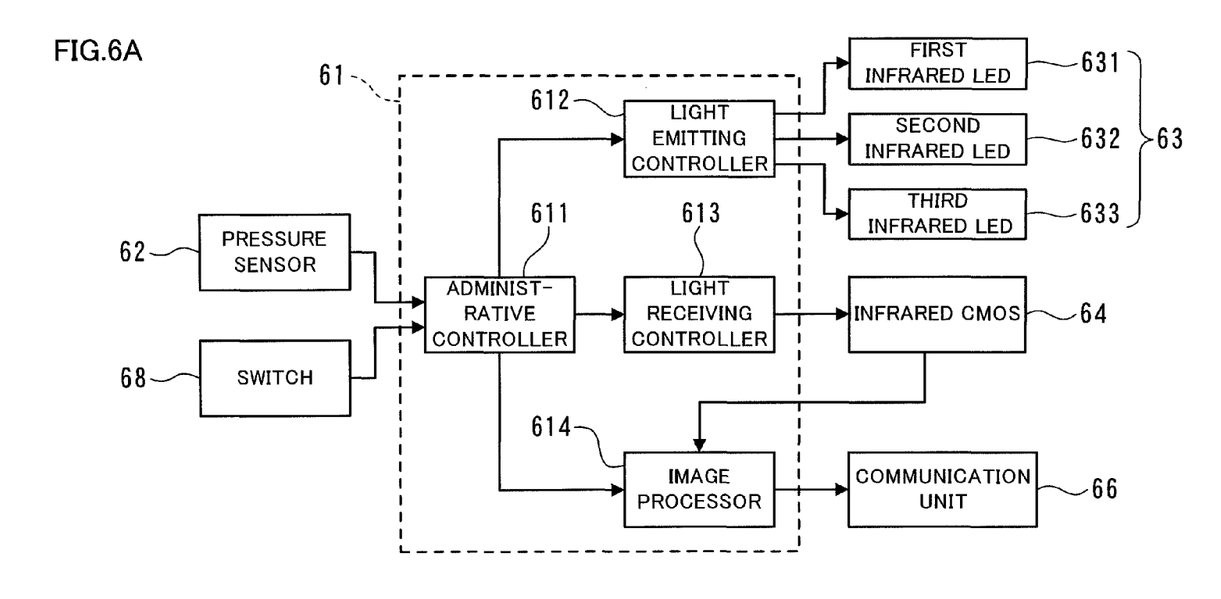
FIG. 6A is a block diagram of a configuration of the controller shown in FIG. 3.

FIG. 6A is a block diagram of a configuration of the controller 61 shown in FIG. 3.

The controller 61 includes an administrative controller 611, a light emitting controller 612, a light receiving controller 613 and an image processor 614.

The administrative controller 611 performs administrative control on the light emitting controller 612, the light receiving controller 613 and the image processor 614 based on signals inputted from the pressure sensor 62 and the switch 68. The administrative control includes various setting changes according to the mode switching between the writing mode and the reference information acquiring mode. The light emitting controller 612 that functions as an example of emitting setting unit according to the present exemplary embodiment controls a light emitting operation of a first infrared LED 631, the second infrared LED 632 and the third infrared LED 633 that form the infrared LED unit 63, based on an instruction received from the administrative controller 611. The light receiving controller 613 that functions as a light receiving setting unit controls a light receiving operation of the infrared CMOS 64 based on an instruction received from the administrative controller 611. The image processor 614 that functions as an information acquiring unit and an information acquiring setting unit performs an image processing for a received-light data inputted from the infrared CMOS 64, and then outputs the result to the communication unit 66, based on an instruction received from the administrative controller 611.

Figure 6B:
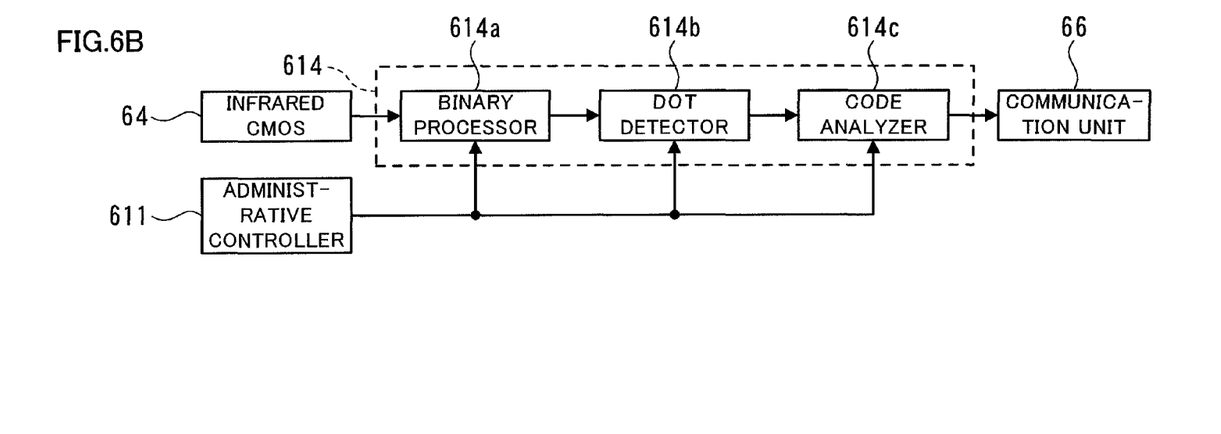
FIG. 6B is a block diagram of a configuration of the image processor shown in FIG. 6A.

FIG. 6B is a block diagram of a configuration of the image processor 614 shown in FIG. 6A.

The image processor 614 which functions as an example of an analyzer according to the present exemplary embodiment includes a binary processor 614a, a dot detector 614b and a code analyzer 614c.

The binary processor 614a outputs the received-light data inputted from the infrared CMOS 64 by binarizing each image element. The dot detector 614b detects dots from the binalized received-light data. The code analyzer 614c analyzes the code pattern from an arrangement of the detected dots, acquires information such as the identity information and the location information from the analyzed code pattern, and outputs the acquired information to the communication unit 66. The information outputted from the code analyzer 614c is temporarily stored in the information memory 65 as necessary.

As mentioned later, the various processings performed by the binary processor 614a, the dot detector 614b and the code analyzer 614c are different depending on whether the digital pen 600 is set to the writing mode or the reference information acquiring mode. The processings performed by the binary processor 614*a*, the dot detector 614*b* and the code analyzer 614*c* change based on the instruction received from the administrative controller 611. In the following description, a binary processing performed by the binary processor 614*a*, a dot detection processing performed by the dot detector 614*b* and a code analysis processing performed by the code analyzer 614*c* are collectively referred to as "a decoding processing."

Figure 7:
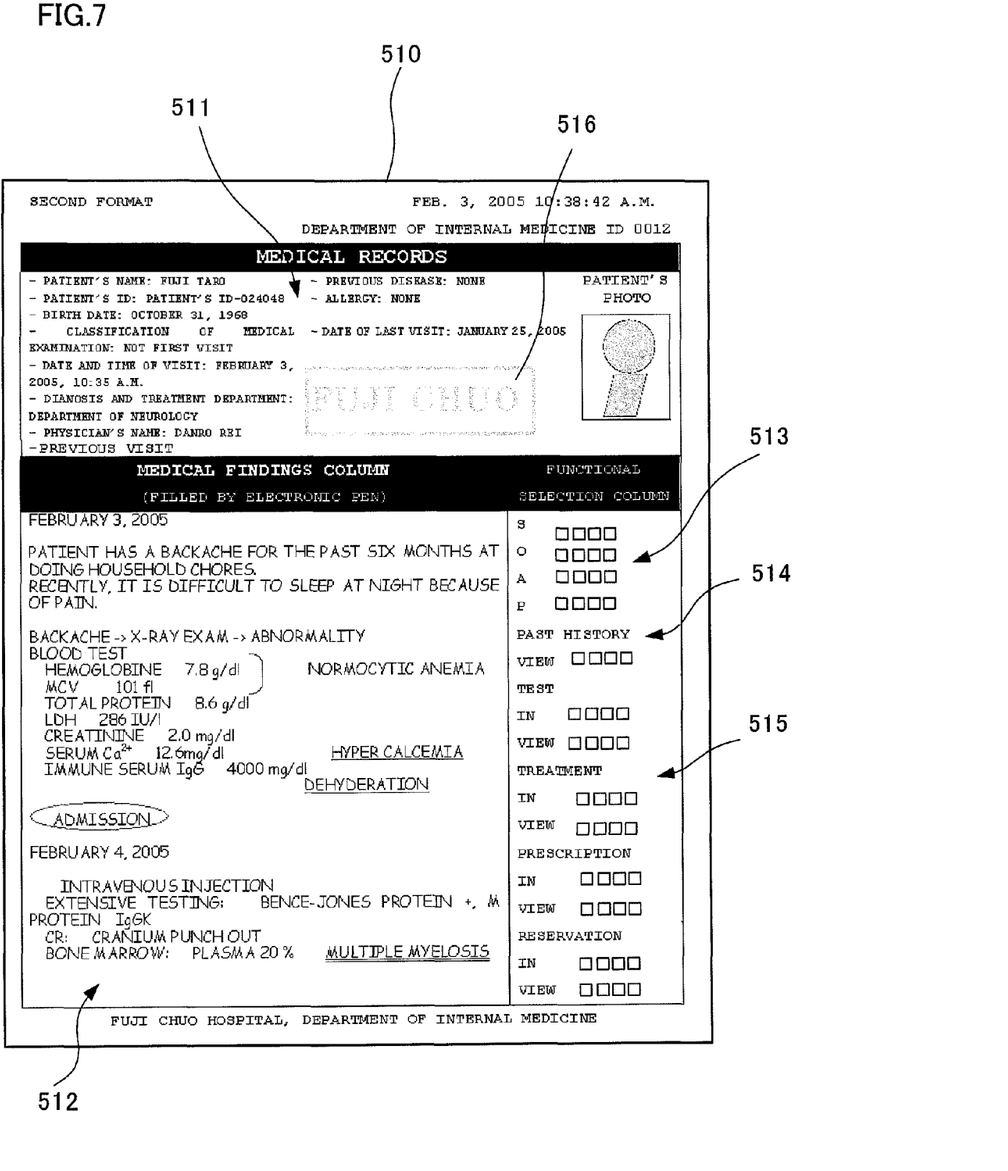
FIG. 7 shows a carte form of a carte sheet as an example of the printed material.

Here, the printed material 500 that is to be written or read by the digital pen 600 is described with referring to an example. FIG. 7 shows a carte form of a carte sheet 510 as an example of the printed material 500. In an image forming apparatus 400 shown in FIG. 1, by using the visible toner, layout information such as ruled lines of the carte form is printed on the carte sheet 510. At the same time, in the image forming apparatus 400, by using the invisible toner, a carte ID which is an example of the identity information to uniquely specify the sheet one by one, and the code pattern image which indicates the location information (coordinate information) on the carte sheet 510 are printed on the entire surface of the carte sheet 510.

As shown in FIG. 7, the carte form of the carte sheet 510 includes a patient basic information entry field 511 for filling in a patient's name, the birth date, the patient's face photo, the previous disease, the allergy information and the like, and a handwriting information entry field 512 corresponding to, for example, a carte form of a second format. In addition, the carte form includes an entry type selection field 513, a past history information reference field 514 and a system linking function field 515. On the carte form, a transparent image 516 is additionally formed using the invisible toner.

As mentioned above, on the entire surface of the carte sheet 510, the carte ID as an example of the identity information, and the location information on the sheet are printed as a code pattern image. If a handwriting input is performed on the carte sheet 510 using the digital pen 600 that reads the code pattern image, the carte ID and the location information are detected by the digital pen 600 at the same time. With the above operation, the digital pen 600 acquires information of the carte sheet 510 currently used and of the location on which the handwriting input is performed, as electronic information. Since a transparent image 516 is printed using the invisible toner, the printed carte sheet 510 is visually confirmed to be a sheet on which the code pattern image including the identity information and the location information with the invisible toner is printed by the difference of brightness between the transparent image 516 and the carte sheet 510.

For the medical examination of a patient, a doctor enters a medical records into the handwriting information entry field 512 formed in the carte form of the carte sheet 510 using the digital pen 600. At this time, the digital pen 600 is set to the writing mode by an operation of the switch 68. The digital pen 600 reads the printed code pattern image, detects the carte ID and the moving trace of the digital pen 600 on the carte sheet 510, and recognizes the carte and the content of the handwriting input. Then, the handwriting result is displayed by superimposed on the electronic document that is a source of the carte sheet 510 on the terminal apparatus 700.

The contents that are filled in the handwriting information entry field 512 of the carte sheet 510 includes, for example, contents associated with S, O, A and P shown in the entry type selection field 513 in FIG. 7. For example, a patient's subjective information is entered by specifying the subjective complaint (S: subjective). The doctor's medical examination observation and inspection observation are entered by specifying the objective finding (O: objective). The assessment, the discrimination assessment, the medical treatment selection and the reason, and the evaluation of the medical treatment by the doctor are entered by specifying the assessment (A: assessment). The medical treatment plan and others are entered by specifying the plan (P: plan).

When a doctor needs to make reference to, for example, the past medical history that is not described in the carte sheet 510 during a medical examination for a patient, the doctor makes a click on "□" column in the past history information reference field 514 formed on the carte form of the carte sheet 510, that is, a specific area, using the digital pen 600. At this time, the digital pen 600 is set to the reference information acquiring mode by the operation of the switch 68. The digital pen 600 reads a code pattern image printed within "□" in the past history information reference field 514, and recognizes the carte ID and the location information of the digital pen 600 on the carte sheet 510. Thus, an electronic document corresponding to the carte ID and the location information is read out and displayed on the terminal apparatus 700.

When a doctor needs to make reference to the test status, the treatment status, the prescription status and the reservation status of the patient that are not described in the above carte sheet 510, the doctor makes a click on the corresponding "□" column of the system linking function field 515 formed on the carte form of the carte sheet 510, that is, a specific area, using the digital pen 600. Then, the carte ID and the location information are acquired from the read code pattern image, and an electronic document corresponding thereto is displayed on the terminal apparatus 700.

Next, an operation setting of the digital pen 600 is described below. The operation setting in the writing mode of the digital pen 600 according to the present exemplary embodiment is set differently from that in the reference information acquiring mode.

Figure 8A:
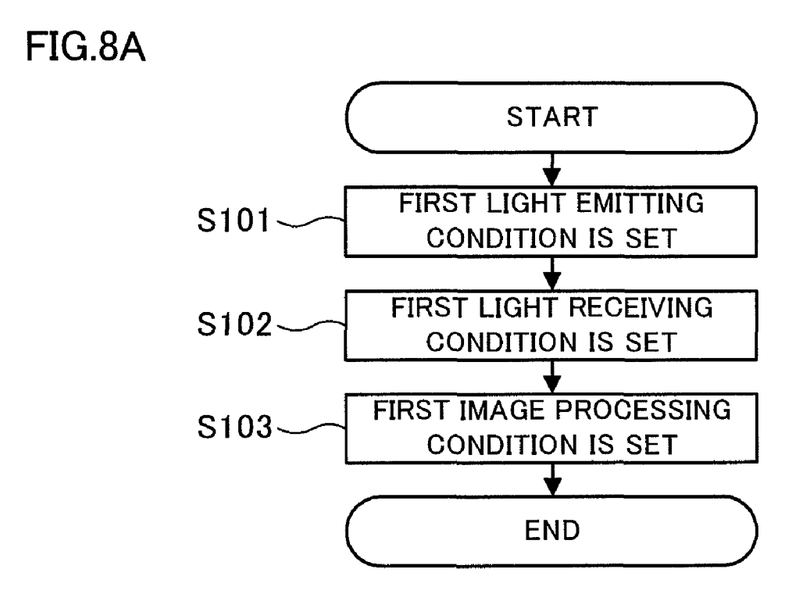
FIG. 8A is a flowchart showing the flow of the operation setting of the digital pen in the writing mode.

FIG. 8A is a flowchart showing the flow of the operation setting of the digital pen 600 in the writing mode.

If setting to the writing mode is received via the switch 68, the administrative controller 611 outputs a control signal to the light emitting controller 612, the light receiving controller 613 and the image processor 614. Following the above, the light emitting controller 612 sets an emitting condition, that is, a light emitting condition, of the infrared LED unit 63 to a first light emitting condition (step 101), the light receiving controller 613 sets the light receiving condition of the infrared CMOS 64 to a first light receiving condition (step 102), and the image processor 614 sets the image processing conditions of the binary processor 614*a*, the dot detector 614*b* and the code analyzer 614*c* to first image processing conditions (step 103).

Figure 8B:
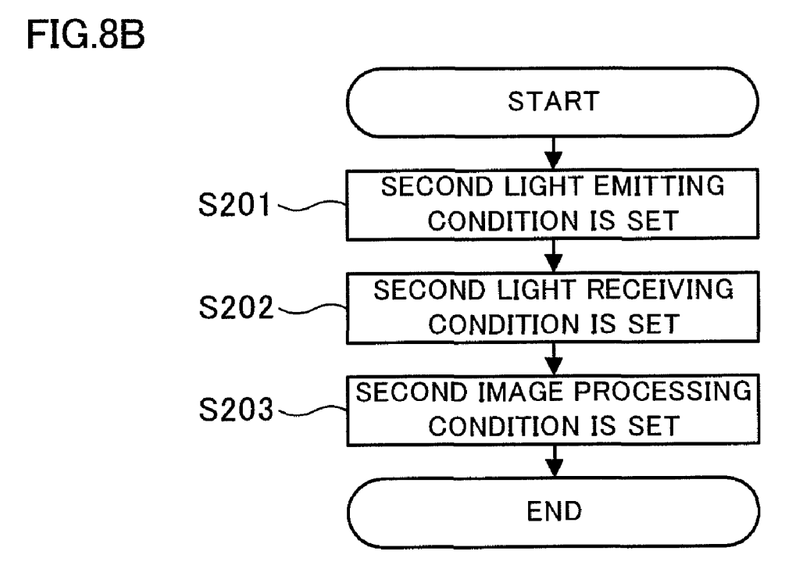
FIG. 8B is a flowchart showing the flow of the operation setting of the digital pen in the reference information acquiring mode.

On the other hand, FIG. 8B is a flowchart showing the flow of the operation setting of the digital pen 600 in the reference information acquiring mode.

If setting to the reference information acquiring mode is received via the switch 68, the administrative controller 611 outputs a control signal to the light emitting controller 612, the light receiving controller 613 and the image processor 614. Following the above, the light emitting controller 612 sets an emitting condition, that is, the light emitting condition, of the infrared LED unit 63 to a second light emitting condition (step 201), the light receiving controller 613 sets a light receiving condition of the infrared CMOS 64 to a second light receiving condition (step 202), and the image processor 614 sets image processing conditions of the binary processor 614*a*, the dot detector 614b, and the code analyzer 614*c* to second image processing conditions (step 203).

Figure 9A:
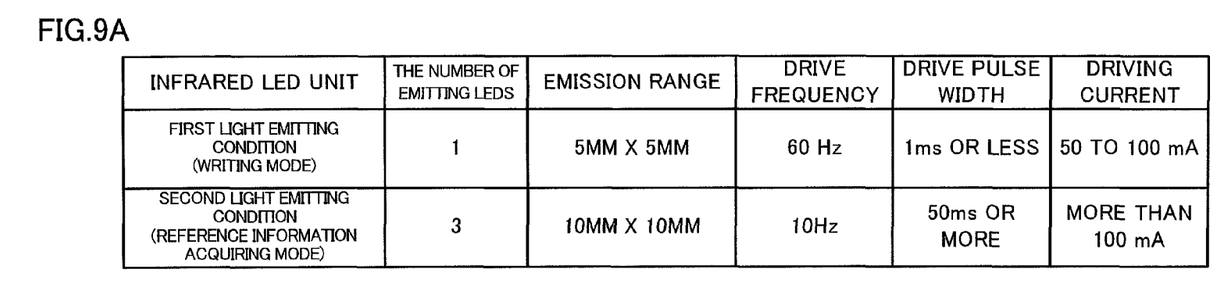
FIG. 9A shows an example of the first light emitting condition and the second light emitting condition which are set in the infrared LED unit.

Here, FIG. 9A shows an example of the first light emitting condition and the second light emitting condition which are set in the infrared LED unit 63.

In the first light emitting condition, among the three infrared LEDs, only the first infrared LED 631, that is, only one LED, is subject to emit the light. Thus, the printed material 500 has an infrared light emission range of, for example, approximately 5 mm by 5 mm. In the first light emitting condition, the drive frequency of the first infrared LED 631 that is to emit the light is set to 60 Hz, the drive pulse width is set to 1 ms or less and the drive current is set in a range from 50 to 100 mA.

On the other hand, in the second light emitting condition, the three infrared LEDs, that is, all of the first infrared LED 631, the second infrared LED 632 and the third infrared LED 633, are to emit the light. Thus, the infrared light emission range of the printed material 500 is, for example, approximately a range of 10 mm by 10 mm, which is wider than that in the first light emitting condition. In the second light emitting condition, the drive frequency of the first infrared LED 631, the second infrared LED 632 and the third infrared LED 633 that are to emit the light is set to 10 Hz, the drive pulse width is set to 50 ms or more, and the drive current is set to a value higher than 100 mA.

Figure 9B:
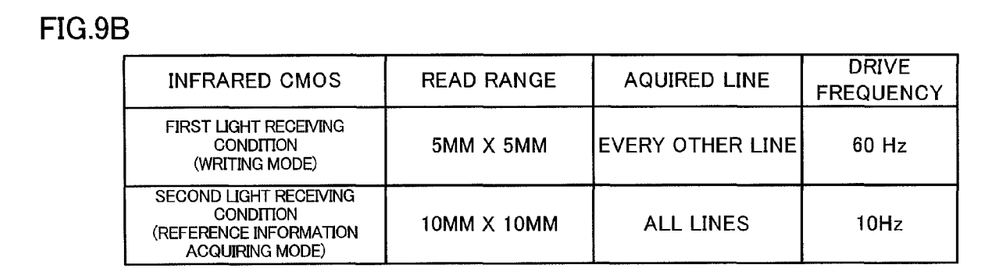
FIG. 9B shows an example of the first light receiving condition and the second light receiving condition which are set to the infrared CMOS.

FIG. 9B shows an example of the first light receiving condition and the second light receiving condition which are set to the infrared CMOS 64.

In the first light receiving condition, the read range of the printed material 500 with the infrared CMOS chip 641 is set to a range of 5 mm by 5 mm, that is, the range of the first light receiving area 644 shown in FIG. 5, and the acquired line is set to a half number of lines that is every other lines in all lines. In the first light receiving condition, the drive frequency of the infrared CMOS chip 641 that is to receive the light is set to 60 Hz.

On the other hand, in the second light receiving condition, the read range of the printed material 500 with the infrared CMOS chip 641 is set to a range of 10 mm by 10 mm, that is, the range of the second light receiving area 645 shown in FIG. 5, and acquired lines are set to all lines. In the second light receiving condition, the drive frequency of the infrared CMOS chip 641 that is to receive the light is set to 10 Hz.

Figure 9C:
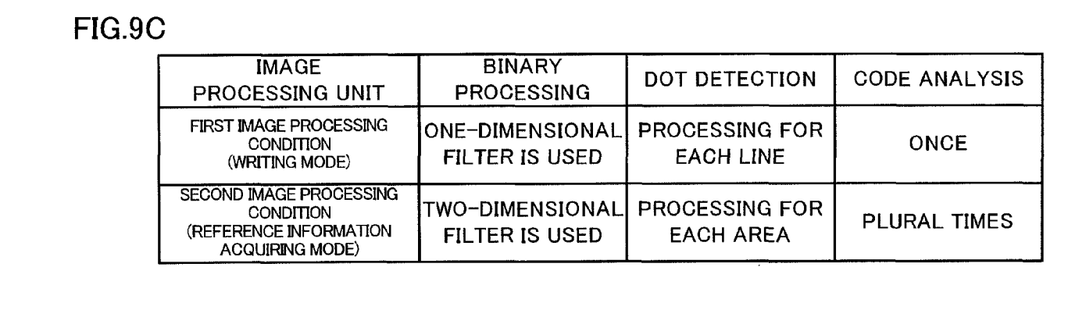
FIG. 9C shows an example of the first image processing condition and the second image processing condition which are set to the image processor.

Further, FIG. 9C shows an example of the first image processing condition and the second image processing condition which are set to the image processor 614.

In the first image processing condition, the binary processor 614a performs a processing using a one-dimensional filter. In the first image processing condition, the dot detector 614b performs a processing for each line, that is, a one-dimensional dot detection processing. Further, the code analyzer 614c performs the code analysis processing only once for the detected dot.

On the other hand, in the second image processing condition, the binary processor 614a performs a processing using a two-dimensional filter. In the second image processing condition, the dot detector 614b performs a processing for each area including plural lines, that is, a two-dimensional dot detection processing. The code analyzer 614c performs the code analysis processing plural times for the detected dots.

In the writing mode, the drive frequency of the infrared LED unit 63 and the infrared CMOS 64 is set to 60 Hz, resulting in 60 infrared images acquired per second. Each of the acquired infrared images corresponds to a size of 5 mm by 5 mm on the carte sheet 510, and the resolution is set to 300 dpi.

On the other hand, in the reference information acquiring mode, the drive frequency of the infrared LED unit 63 and the infrared CMOS 64 is set to 10 Hz, resulting in 10 infrared images acquired per second. Each of the acquired infrared images corresponds to a size of 10 mm by 10 mm on the carte sheet 510, and the resolution at the time is set to 600 dpi.

In other words, according to the present exemplary embodiment, the number of the infrared images acquired per unit time in the writing mode, that is, the number of the acquired images, is larger than the number of the acquired images per unit time in the reference information acquiring mode.

In the writing mode, a writing operation is continuously performed on the same carte sheet 510. The infrared image data acquired by the writing operation is configured by one or plural strokes, each of which is formed by plural consecutive images. In one stroke, the tip of the digital pen 600 never moves to another carte sheet 510 or a distant location. Thus, even when the decode ratio per one infrared image (acquiring precision of the carte ID and the location information) is lower to some extent, there may be no problems as long as the carte ID and the location information are comprehensively acquired from the plural infrared images included in one stroke. For example, in case where a stroke is configured by ten infrared images, if each infrared image has an error recognition ratio of 10%, the total value becomes $10^{-10}$%, which causes no problems practically. For example, even if a stroke includes a few or less infrared images in such a case where a point appearing in characters like "i" and "j" is entered, strokes that is consecutively performed in a short time may have a higher possibility that the strokes are performed in the same document and the latter stroke is located near the former stroke, as the time interval becomes narrower. Thus, taking all into consideration comprehensively, even if the error recognition ratio of one infrared image takes a higher value to some degree, this causes no problems practically. In the writing mode, the content written by the digital pen 600 remains on the carte sheet 510. Thus, there is no necessity to send immediately the written information to the terminal apparatus 700 for display but the written information may be sent to the terminal apparatus 700 after one stroke or a series of writing operation is completed and comprehensive judgment on the carte ID and the location information are made in the image processor 614. Then, in the writing mode, as 60 infrared images are acquired in a second, the data amount per unit time tends to increase while a shorter decoding speed per one infrared image is further required.

On the other hand, in the reference information acquiring mode, for example, by making one click on a specific area such as "☐" column on the past history information reference field 514, it is required to securely refer to a link destination such as an electronic document. Unlike in the writing mode, the tip location of the digital pen 600 hardly changes within one stroke. Thus, in the reference information acquiring mode, the number of the infrared images used for the decode may be less than that in the writing mode, but it is required to decrease the error recognition ratio per an infrared image lower than that in the writing mode.

For this purpose, in the present exemplary embodiment, depending on a function required in the writing mode and in the reference information acquiring mode, levels of the light emission control, the light receiving control and the image processing are to be changed.

For example, in the writing mode, the number of the acquired infrared images per unit time is made larger than that in the reference information acquiring mode while the read area is made smaller than that in the reference information acquiring mode and the read resolution is also made lower than that in the reference information acquiring mode, so that the data amount per one infrared image is made smaller than that in the reference information acquiring mode. In other words, the read precision of the infrared image in the writing mode is lower than that in the reference information acquiring mode. Additionally, in the writing mode, the quantity of the infrared light emitted from the infrared LED unit 63 is made smaller than that in the reference information acquiring mode to save the power consumption. Further, in the writing mode, light emitting duration of the infrared light emitted from the infrared LED unit 63 at one time is made shorter than that in the reference information acquiring mode, to reduce a blur of the acquired infrared image. Moreover, in the writing mode, the content of the image processing in the image processor 614, that is, the acquiring precisions of the carte ID and the location information, is made lower than that in the reference information acquiring mode, so that the processing time taken per one infrared image is made shorter than that in the reference information acquiring mode.

On the other hand, in the reference information acquiring mode, the number of the acquired infrared images per unit time is made smaller than that in the writing mode while the read area is made larger than that in the writing mode and the read resolution is also made higher than that in the writing mode so that the data amount per one infrared image is made larger than that in the writing mode. In other words, the read precision of the infrared image in the reference information acquiring mode is made higher than that in the writing mode. Additionally, in the reference information acquiring mode, the quantity of the infrared light emitted from the infrared LED unit 63 is made larger than that in the writing mode, and infrared image with higher contrast than that in the writing mode is acquired. In addition, in the reference information acquiring mode, light emitting duration of the infrared light emitted from infrared LED unit 63 at one time is made longer than that in the writing mode so that the precision of acquired infrared image is increased. Moreover, the content of the image processing in the image processor 614, that is, the acquiring precision of the carte ID and the location information, is made higher than that in the writing mode, so that the carte ID and the location information are precisely acquired from a few infrared images.

According to the present exemplary embodiment, both in the writing mode and in the reference information acquiring mode, the decoding processing is performed in the digital pen 600. However, it is not limited to this case. For example, in the reference information acquiring mode, the infrared image data acquired by the digital pen 600 is directly sent to the terminal apparatus 700, and then the terminal apparatus 700 may perform the decoding processing. In the writing mode, the number of the infrared images acquired per unit time is more than that in the reference information acquiring mode, thus the decoding processing becomes more efficient if performed in the digital pen 600. However, in the writing mode, all the decoding processing may not be necessarily performed in the digital pen 600, and, for example, the transmission may be performed after performing only the binary processing or after performing the binary processing and the dot detection processing.

In the present exemplary embodiment, both the read range and the read resolution of the infrared images are changed in the writing mode and in the reference information acquiring mode. However, instead of that, any one of them may be changed. Further, in the present exemplary embodiment, both the number of the infrared LEDs that emit the infrared light and the drive current supplied to the infrared LED are changed in the writing mode and the reference information acquiring mode. However, instead of that, any one of them may be changed.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The present exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electronic writing instrument comprising:
    a writing unit that writes down on a medium where a code indicating identity information and location information of the medium is formed;
    an emitting unit that emits light to the medium;
    a photoelectric conversion unit that includes a photoelectric conversion element receiving a reflected light from the medium by the light emitted by the emitting unit and outputting an electronic signal after converting the reflected light by photoelectric conversion;
    a receiving unit that receives a user operation; and
    a condition changing unit that changes, in response to the receiving unit receiving the user operation, at least one of:
        an emitting condition of the emitting unit when emitting light to the medium; and
        an output condition of the photoelectric conversion unit when receiving the reflected light from the medium,
    wherein the electronic writing instrument further comprises:
        an acquiring unit that acquires a code image formed on the medium, wherein
        the acquiring unit, according to the operation received by the receiving unit, switches between a first acquiring mode and a second acquiring mode, the first acquiring mode acquiring the predetermined number of code images per unit time with a predetermined information amount, the second acquiring mode acquiring the number of code images per unit time smaller than the number of the code images per unit time in the first acquiring mode, with an information amount per acquired code image larger than the information amount per acquired code image in the first acquiring mode.

2. The electronic writing instrument according to claim 1, wherein the condition changing unit changes, as the emitting condition, at least any one of the number of the emission per unit time, quantity of the emitted light per unit time and an emission range to the medium by the emitting unit.

3. The electronic writing instrument according to claim 1, wherein the condition changing unit changes, as the output condition, at least any one of the number of the photoelectric conversion elements that performs outputs after the photoelectric conversion and the number of the outputs per unit time of the photoelectric conversion unit.

4. The electronic writing instrument according to claim 1, further comprising:
    an acquiring unit that acquires a code image formed on the medium, wherein the acquiring unit, according to the operation received by the receiving unit, switches between a first acquiring mode and a second acquiring mode, the first acquiring mode acquiring the predetermined number of code images per unit time with a predetermined image size, the second acquiring mode acquiring the number of code images per unit time smaller than the number of the code images per unit time in the first acquiring mode, with an image size per acquired code image larger than the image size per acquired code image in the first acquiring mode.

5. The electronic writing instrument according to claim 1, further comprising:
an acquiring unit that acquires a code image formed on the medium; and
an information acquiring unit that decodes the code image acquired by the acquiring unit, and acquires the identity information and the location information, wherein
the condition changing unit changes an information acquiring condition of the information acquiring unit.

6. A computer system having: an electronic writing instrument that writes down on a medium and reads information from the medium; and an information processing apparatus that performs a processing based on the information received from the electronic writing instrument, the electronic writing instrument of the computer system comprising:
an acquiring unit that acquires a code image on the medium where the code image indicating identity information and location information of the medium is printed;
an information acquiring unit that decodes the code image acquired by the acquiring unit, and acquires the identity information and the location information; and
a changing unit that changes an acquiring condition of the acquiring unit so that the acquired number of code images per unit time in a first acquiring mode acquiring the code image on the medium according to a writing operation to the medium is larger than the acquired number of code images per unit time in a second acquiring mode acquiring the code image formed in a specific area of the medium and information amount of one code image acquired in the first acquiring mode is smaller than information amount of one code image acquired in the second acquiring mode, wherein
the information processing apparatus performs a predetermined processing based on the identity information and the location information inputted from the information acquiring unit of the electronic writing instrument.

7. The computer system according to claim 6, wherein
the information processing apparatus performs a processing of reading out an electronic document corresponding to the identity information and superimposing a writing trace corresponding to the location information on the electronic document when the information processing apparatus receives the identity information and the location information acquired in the first acquiring mode from the information acquiring unit, and
the information processing apparatus performs a processing of reading out an electronic document corresponding to the identity information and the location information when the information processing apparatus receives the identity information and the location information acquired in the second acquiring mode from the information acquiring unit.

8. An electronic writing method for computerizing a writing operation, the electronic writing method comprising:
acquiring a code image on a medium corresponding to a writing operation to the medium where the code image indicating identity information of the medium and location information in the medium is formed so that the number of images per unit time is set to a first number of images per unit time and an information amount per image is set to a first information amount per image; and
acquiring the code image formed in a specific area of the medium so that the number of images per unit time is set to a second number of images per unit time and an information amount per image is set to a second information amount per image, the second number of images per unit time being less than the first number of images per unit time, and the second information amount per image being larger than the first information amount per image.

9. A non-transitory computer readable medium storing a program causing a computer to execute a process for computerizing a writing operation, the process comprising:
acquiring a code image on a medium corresponding to a writing operation to the medium where the code image indicating identity information of the medium and location information in the medium is formed so that the number of images per unit time is set to a first number of images per unit time and an information amount per image is set to a first information amount per image; and
acquiring the code image formed in a specific area of the medium so that the number of images per unit time is set to a second number of images per unit time and an information amount per image is set to a second information amount per image, the second number of images per unit time being less than the first number of images per unit time, and the second information amount per image being larger than the first information amount per image.

10. The electronic writing instrument according to claim 1, wherein the condition changing unit changes the at least one of the emitting condition and the output condition to thereby change from a writing mode to a reference information acquiring mode.

11. The electronic writing instrument according to claim 10, wherein a read resolution of the reference information acquiring mode is greater than that of the writing mode.

12. The electronic writing instrument according to claim 10, wherein a quantity of light emitted by the emitting unit in the reference information acquiring mode is greater than that in the writing mode.

13. The electronic writing instrument according to claim 10, wherein a light emitting duration of the emitting unit in the reference information acquiring mode is greater than that in the writing mode.

* * * * *